April 12, 1966  R. A. WEST ET AL  3,245,888
METHOD OF ELECTROFORMING AN ELECTROLYTIC CAPACITOR ELECTRODE
Filed Jan. 27, 1961

Inventors,
Robert A. West,
Arthur J. Catotti,
by Sidney Greenberg
Their Attorney.

United States Patent Office 3,245,888
Patented Apr. 12, 1966

3,245,888
METHOD OF ELECTROFORMING AN ELECTROLYTIC CAPACITOR ELECTRODE
Robert A. West, Fort Ann, and Arthur J. Catotti, Granville, N.Y., assignors to General Electric Company, a corporation of New York
Filed Jan. 27, 1961, Ser. No. 85,379
2 Claims. (Cl. 204—58)

The present invention relates to electrolytic capacitors, and more particularly to a novel film-formed electrode for electrolytic capacitors and to a method for making the same.

Conventional electrolytic capacitors are made with a pair of aluminum electrode foils, one or both of which have a dielectric oxide film formed thereon by anodizing the foil in a suitable film-forming electrolyte, such as a boric acid solution. The electrode foils are usually wound into rolled form with porous spacer material between them, the wound foil assembly being immersed in a casing containing a conducting electrolyte which impregnates the spacer material. The spacer material is commonly composed of cellulosic paper and occupies as much as 50% of the capacitor volume. The presence of the spacer material thus markedly increases the size of the capacitor, and correspondingly reduces the capacitance-to-volume ratio, and in addition results in such disadvantages as increased impedance and dissipation factor, as well as less desirable low temperature characteristics.

Aluminum electrolytic capacitors of the above type are also known wherein superposed porous and dense oxide layers are anodically formed in separate processes on the surface of the aluminum foil electrode. In such capacitors, the dense oxide layer is next to the foil surface and serves as the capacitor dielectric layer, while the relatively thicker porous oxide layer overlies the dense film and serves as a protective coating therefor. Such a structure and the methods of producing it have certain drawbacks. For one thing, different electrolytes and separate procedures must be used to form the respective oxide layers, thus increasing the complexity, time and cost of the anodizing process. It is difficult with the prior art processes to form the two films so that the dense dielectric layer is sufficiently thin for low voltage applications while the porous protective oxide layer is sufficiently thick to provide effective mechanical protection. This is because the prior art film-forming processes are such that the conditions which produce an adequately thick porous layer also produce an excessively thick dense layer.

It is an object of the invention to provide an aluminum electrolytic capacitor which dispenses with the need for spacer material such as employed heretofore by the prior art, and to provide a method of making the same.

It is a further object of the invention to provide an electrolytic capacitor of the above type wherein the capacitor is adapted for low voltage applications.

It is another object of the invention to provide a method of making capacitors of the above types which is simpler, more economical, and more easily carried out than prior art processes.

Other objects and advantages will become apparent from the following description and the appended claims.

With the above objects in view the present invention relates to the method of forming a dielectric film on an aluminum capacitor electrode. In accordance with the invention the electrode is first immersed in an anodizing electrolytic bath at 20–40° C. The bath is an aqueous solution of a strong acid which has the ability to form a film on an aluminum surface and to dissolve an anodized film on an aluminum surface. A direct current voltage is then applied across the electrode and electrolyte with the electrode as anode to deposit a continuous, dense dielectric film thereon. Application of this voltage is continued, while maintaining a relatively constant bath composition, temperature and current density, to remove multitudinous discrete portions of the dense dielectric film from the surface thereof as the film is formed. This creates or forms a porous outer layer in the film resulting in a dielectric film having an inner, dense dielectric layer 20–350 Angstrom units thick adjacent the electrode and a porous layer overlying the dense layer.

The invention will be better understood from the following description taken in conjunction with the accompanying drawing, in which.

Figure 1:
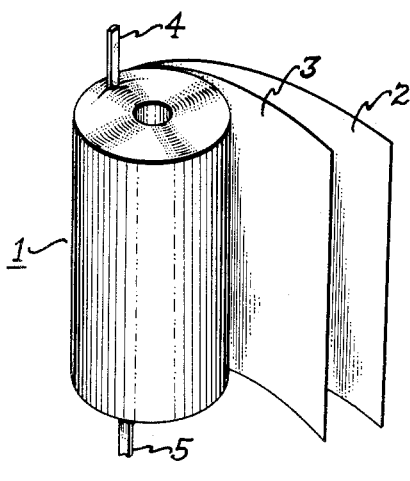
FIGURE 1 shows a partially unrolled capacitor section which embodies the present invention.

Referring now to the drawing, and particularly to FIGURE 1, there is shown an electrolytic capacitor section 1 comprising a pair of superimposed aluminum electrode foils 2 and 3 convolutely wound into a roll without any separate spacer material therebetween. Terminal leads 4 and 5 extending from opposite sides of roll 1 are respectively electrically connected to foils 2 and 3. The surfaces of aluminum foils 2 and 3 in the embodiment shown are preferably, but not necessarily, etched in accordance with well known processes, and are provided with an anodically formed oxide layer 16 (see FIG. 4) as more fully described hereinafter, which serves both as a separating and protective layer and as a dielectric barrier film.

In a polar type capacitor, one of the aluminum foils (the cathode) will preferably be etched and have formed thereon only a semi-porous type of oxide film as provided in accordance with the invention and as hereinafter more fully described, while the other foil (the anode) will have only the conventional dense type dielectric barrier film and is preferably etched. In another type of polar capacitor, one foil (the anode) will have the semi-porous film thereon of the present invention while the other foil (the cathode) will have no dielectric film thereon at all. In a non-polar capacitor, each of the foils will have only the semi-porous type film of the invention thereon.

Figure 2:
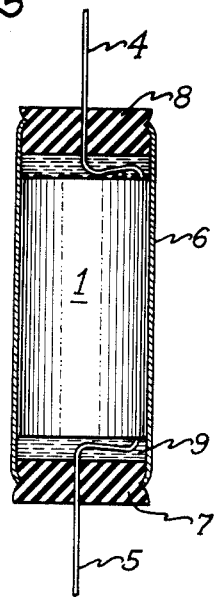
FIGURE 2 shows the capacitor section of FIG. 1 assembled in a completed capacitor unit.

FIGURE 2 shows capacitor roll 1 arranged in operative assembly within a casing 6 which may be of metal or of any other suitable material which is fluid-tightly sealed at opposite ends by insulating seal plugs 7 and 8 with leads 4 and 5 extending therethrough. Electrolyte 9, composed of any known or suitable fill electrolyte solution, such as an ammonium pentaborate-ethylene glycol solution, fills casing 6 and thoroughly impregnates capacitor roll section 1 so as to permeate the porous portions of the semi-porous dielectric layer between aluminum foil members 2 and 3.

Figure 3:
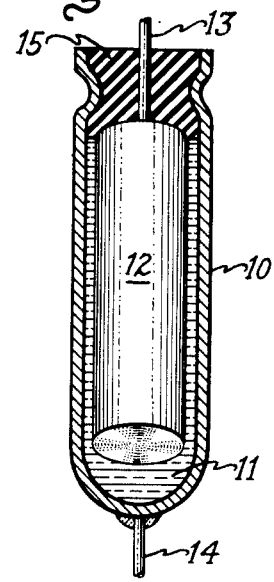
FIGURE 3 is a partly sectional view of another type of a capacitor in which the invention may be embodied.
Figure 4:
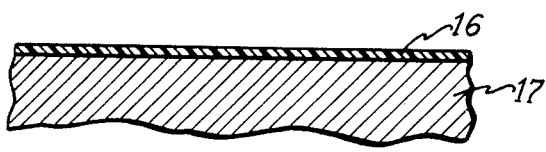
FIGURE 4 is a cross-sectional view of a portion of a film-formed aluminum electrode embodying the present invention.
Figure 5:
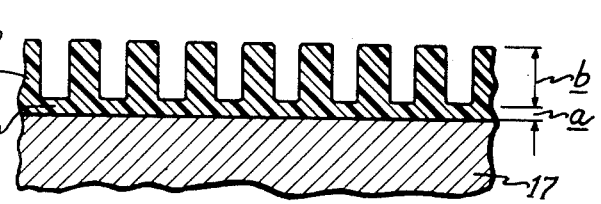
FIGURE 5 shows diagrammatically and in exaggerated proportions the detailed structure of the film formed on the electrode of FIGURE 4.

FIGURE 3 shows another type of electrolytic capacitor in which the present invention may be embodied, and which comprises a casing 10 of any suitable or desired metal, such as silver, serving as the cathode and containing a fill electrolyte 11 in which a convolutely wound aluminum foil anode 12 is immersed. Wound foil member 12 has, in accordance with the invention, a semi-porous dielectric anodic oxide film formed on the surface thereof, such as shown in FIGURES 4 and 5. Casing 10 is fluid-tightly sealed by insulating seal plug 15 through which anode lead 13 passes, the casing having at its opposite end a cathode lead 14 suitably joined to the casing by welding or other means. In a typical application, casing 10 may closely fit around wound anode foil 12, as for example in those electrolytic capacitor units which must be very small in size. In such close-fitting units, the semi-porous dielectric film hereinafter described in detail serves as an effective physical separator between the wound foil anode 12 and the interior of cathode casing 10 while still permitting permeation of the porous portion by the liquid electrolyte.

It will be understood that other types of electrolytic capacitors may have the present invention embodied therein with advantageous results, and the film-formed aluminum member of the present invention may have configurations other than those shown in the drawing.

FIGURE 4 shows an enlarged cross-sectional view a portion of aluminum foil electrode 17, which corresponds to previously described aluminum foil members 2, 3 or 12, having the semi-porous oxide layer 16 formed thereon. Oxide layer 16 may be formed on foil 17 by known methods such as by anodizing the foil in a solution of a relatively strong acid, for example, oxalic acid, phosphoric acid, chromic acid, or sulfuric acid. Heretofore, such a film-forming process has been used in conjunction with a subsequent anodizing step wherein the foil is anodized in a weak acid solution, such as boric acid, or such other known film-forming electrolytes as have little or no solvent action on the formed film. The film formed by the latter process is a non-porous, dense barrier-type layer which is much thinner than the film formed in the strong acid, the thickness of the dense barrier-type principally determining the capacitance of the capacitor as well as the level of voltage applied in the operation of the unit. Such subsequent anodization to form a dielectric barrier film has been considered necessary by the prior art because the oxide layer formed by the relatively strong acid anodizing electrolyte has been considered to be entirely porous and thus to have no significant dielectric barrier effect or function.

We have found, however, that such so-called "porous" oxide layers are in fact integrally associated with a dense barrier portion which may effectively serve as a capacitor barrier layer itself without the necessity for an additional anodizing procedure as found necessary in the prior art. The invention thus makes possible a single step process for producing a single homogeneous anodic oxide film having a dense barrier portion and a porous separator portion which is adapted to simultaneously serve two different functions in the operation of the capacitor. The expression "semi-porous" as applied to this anodic oxide layer and as used herein is intended to refer to a layer as so described.

FIGURE 5 diagrammatically shows in greater detail the structure of semi-porous anodic oxide layer 16 as formed in accordance with the invention on aluminum foil 17. As will be seen, layer 16 is composed generally of two integral portions, outer portion 16b being porous and relatively thick, while inner portion 16a adjacent the surface of foil 17 is non-porous and relatively thin. The capacitance afforded by the anodic layer 16 is dependent essentially on the thickness $a$ of barrier portion 16a, while thickness $b$ of the outer porous portion 16b has little or no effect on the capacitance, portion 16b having simply a protective or separator function in the capacitor electrode assembly.

The thickness $a$ of barrier portion 16a is determined by the conditions of the anodizing process, such as the type, strength or concentration of the acid employed in the anodizing electrolyte, the temperature of the electrolyte solution, and the current density employed in the process. The thickness $b$ of porous portion 16b is determined by the number of coulombs passed per unit area and the efficiency of the anodizing system being employed. The conditions favoring a lower thickness for barrier portion 16a such as higher temperatures, increased acid strength, and low current density, are not conducive to producing a thick porous layer 16b. Under these more extreme conditions, the dissolution of the oxide film occurs generally, rather than specifically at the base of the pores.

In a typical process of making a capacitor having a semi-porous layer as above-described, a pair of etched aluminum foils were anodized in a 3% aqueous solution of oxalic acid at 20° C. for 30 minutes at a voltage of 35 volts D.C. and at a current density of 160 milliamperes (ma.) per square inch of projected area. The thus treated foils were wound together without any separate spacer material between them, and it was found that such a roll section served to produce a satisfactory 25-volt capacitor when impregnated with a suitable electrolyte, e.g. 19% ammonium pentaborate in ethylene glycol-water solution. This capacitor had a capacitance of 91 microfarads, a dissipation factor of 3.7% at 120 cycles per second and a leakage current of 10 microamperes at 25 volts D.C.

In another typical process, etched aluminum foils four mils thick were anodized in a 4% aqueous phosphoric acid solution at a current density of 150 milliamperes per square inch of projected area for 40 minutes. In this process the final formation voltage was 31–35 volts D.C. and the temperature ranged from about 34 to 39° C. A number of capacitor units were made by winding together pairs of such foils without any spacer material as in the previously described process, and were impregnated with a fill electrolyte comprising a solution of ammonium pentaborate, ethylene glycol, and boric acid. Such capacitors were found to have a leakage current of about 8.7 microamps at 16.5 volts D.C., a capacitance of about 115 microfarads, and a dissipation factor of about 8%. These capacitors showed remarkable stability even under life test conditions up to 1000 hours at 85° C. and 16 volts D.C.

When electrodes made in accordance with the above-described single stage anodizing process are incorporated without further treatment into capacitors, the capacitors are generally adapted for use only in applications involving voltages above 15 volts. This is because, as already indicated, it is difficult to achieve in such single-stage anodizing a sufficiently thin barrier portion while obtaining an adequate thickness of the porous portion to provide satisfactory mechanical protection. While a thinner dielectric barrier layer may be obtained by using in the anodizing processes higher temperatures, or greater strength of the electrolyte, or by lower current density, such measures usually result in substantial reduction of the thickness of the porous portion of the anodic film. At any temperature, for example, there is a balance between the formation of a film by the anodization process and the dissolving in the electrolyte of the film thus being formed. At lower temperatures greater relative dissolution of the barrier portion occurs with respect to the dissolution of the porous portion. At higher temperatures, the rates of dissolution of the respective portions are more nearly alike. As a result, the thickness of the very thin barrier portion is much more significantly reduced than that of the porous portion.

With these considerations as a basis, we provide as a further feature of the invention a convenient and efficient method of producing a capacitor electrode of the above semi-porous anodic film type which is adapted for low voltage applications. In this process, the semi-porous anodic film is produced according to the previously described procedure to obtain the desired thickness of the porous portion required for its separator and protective function. This results in a dense barrier layer having a thickness too great for very low voltage application. In accordance with this aspect of the invention, the film-formed electrode is then subjected for a short time to a treatment whereby the thickness of the dense barrier portion of the oxide film is reduced to the desired low voltage level, while the thickness of the porous portion is not significantly reduced. In addition to the achievement of a lower voltage barrier layer while retaining the separator effect of the porous portion, the further benefit of increased capacitance due to the thinner dielectric barrier layer is obtained by this procedure. In order to satisfactorily reduce the thickness of the barrier portion of the oxide layer in accordance with this aspect of the invention, the filmed electrode may be treated in an anodizing electrolyte bath at a relatively higher temperature, or a stronger electrolyte solution, or at a lower current density than is employed in the original anodizing procedure, or by a combination of such steps.

An example of a process carried out in accordance with this embodiment of the invention is as follows. A pair of etched aluminum foils were anodized in a 3% oxalic acid solution at 25° C. for 30 minutes at a current density of 200 milliamperes per square inch. The resulting barrier thickness was equivalent to 35 volts and would give a capacitance of 90 microfarads if wound as a 25-volt capacitor. These anodes were then treated in 3% oxalic solution at 75° C. for about 30 seconds and a current density of about 150 milliamps per square inch, which resulted in a barrier portion thickness of less than 10 volts equivalent. The anodes when wound into a capacitor section gave a satisfactory 4.5 volt capacitor having a capacitance of 491 microfarads at 120 cycles per second, a dissipation factor of 11.8%, and a leakage current of 6 microamperes of 4.5 volts D.C.

In another example of this embodiment of the invention, anode material was prepared by anodizing etched aluminum foil 1¼″ wide by 12″ long and 4 mils thick in a 0.1% solution of ammonium phosphate ($NH_4H_2PO_4$) at 85° C. to 16 volts D.C. Etched aluminum foil for use as cathode material was then anodized, this foil being 1¼″ wide by 16″ long and 4 mils thick. This foil was anodized initially in 4% phosphoric acid solution prepared by diluting 40 grams of concentrated phosphoric acid with 1000 grams of water, the anodization being carried out at 40–43° C. at a current density of 150 milliamperes per square inch for 40 minutes. The terminal voltage was 35–40 volts D.C. Cathodes made of this foil were then treated to reduce the thickness of the barrier portions of the anodic film to a 2-volt equivalent in the following manner: each cathode was immersed separately in 4% phosphoric acid at 68–73° C. The current was then held at 300 ma./in.$^2$ current density until the voltage dropped to about 30 volts D.C., the current was then held at 150 ma./in.$^2$ until the voltage dropped to 10 volts D.C., the current was then held at 75 ma./in.$^2$ until the voltage dropped to 3 volts D.C., and finally the current was held at 50 ma./in.$^2$ until the voltage dropped to 2 volts D.C. The total time for this second stage treatment was about 2 to 3 minutes. Rolled capacitor sections were wound, each comprising a pair of the above-described anodes and cathodes, each pair being wound together without any spacer material therebetween as conventionally used, and assembled into units with an electrolyte composed of ammonium pentaborate-ethylene glycol solution. After life testing for over 1200 hours at 10 volts D.C. and 85° C., it was found that the average leakage current was 9 microamps, the capacitance about 40 microfardas per square inch of anode area, and the dissipation factor was about 13%.

Conventional units made with similar 16 volt anodes and employing unformed etched foil cathodes and a spacer of 4 sheets of 1 mil paper had about 50 microfarads per square inch of anode area. In the conventional units the spacer occupied about ⅓ of the total volume. It is thus evident that the spacerless unit provided by the above-described procedure of the present invention results in a capacitor having substantially more microfarads per cubic inch than a conventional unit of the same rating.

It will be understood that the invention is not limited to the use of oxalic acid or phosphoric acid for the anodizing electrolyte, since other known or suitable types of anodizing electrolytes can be employed, such as dilute sulfuric acid, chromic acid and other forming electrolytes in which the anodic oxide film is somewhat soluble. Such electrolytes are to be distinguished from the type which possess little or no ability to dissolve the oxide films and form coatings which are thin and non-porous, such as those comprising boric acid and borates, and which are accordingly unsuitable for use in the present invention.

In general, the overall thickness of the semi-porous oxide layer formed in accordance with the invention should be at least one micron thick. In the case where etched foil is employed, preferably the overall thickness of the semi-porous layer should not be more than about 4 microns in order to obtain maximum retention of the etch value of the foil. However, the overall thickness may be up to about 10 microns and still afford some etch gain. Normally in the case of etched foil, a thickness of 2 microns is optimum. The thickness of the dense or barrier portion of the semi-porous layer will normally be about 10–14 Angstrom units per volt applied, which corresponds roughly to the voltage rating for which the capacitor is suitable. In the case where non-etched foil is used, the dense portion may have an upper limit of about 1000–1400 Angstrom units thickness, and will usually not have, in the one-stage process described above, a thickness less than about 25 volts equivalent, that is, about 250–350 Angstrom units. In the low voltage capacitors provided by the two-stage process of the invention, the barrier portion will normally have a thickness ranging from about 20 Angstrom units to 350 Angstrom units.

There is thus provided by the invention an electrolytic capacitor which dispenses with the need for the conventional separate spacer component, which is accordingly markedly reduced in volume for the same capacitance and has improved electrical properties especially at low temperature, and which may be made by considerably simpler and more economical methods than heretofore conventionally employed in the prior art. In addition, the invention provides for a capacitor of the above type which is especially adapted for very low voltages, and for a method of making such capacitors which involves only a relatively simple variation from the above-described single stage process.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. The method of forming a dielectric film on an aluminum capacitor electrode comprising the steps of:
   (a) immersing said electrode in an anodizing electrolytic bath at 20–40° C., said bath comprising a dilute aqueous solution of a strong acid, said acid being characterized by its ability to form a film on an aluminum surface and by its ability to dissolve an anodized film on an aluminum surface,
   (b) applying a direct current voltage across said electrode and electrolyte, with said electrode forming the anode, establishing a preselected current density to begin deposition of a dense dielectric film continuous over the surface of said electrode, and
   (c) continuing the application of said voltage, while maintaining a relatively constant bath composition, temperature, and current density, to remove multitudinous discrete portions of the dense dielectric film from the surface thereof as the film is formed and thus form a porous outer layer in said film, whereby the dielectric film comprises an inner dense dielectric layer 20–350 Angstrom units thick adjacent said electrode, and a porous layer overlying said dense layer which is substantially thicker than said dense layer.

2. The method of claim 1 including the additional step of reducing the thickness of said dense dielectric layer formed in step (a) by elevating the temperature of said electrolyte above 50° C. following step (c) and then applying a direct current voltage across said electrolyte and said electrode until the potential measured across said dielectric film reaches a value approximately equal to that at which it is desired to have a capacitor operate which would utilize said electrode.

References Cited by the Examiner

UNITED STATES PATENTS

| | | | |
|---|---|---|---|
| 1,658,976 | 2/1928 | Edelman | 317—230 |
| 1,965,693 | 7/1934 | Work | 204—42 |
| 1,986,779 | 1/1935 | Lilienfeld | 317—230 |
| 2,052,575 | 9/1936 | Lilienfeld | 317—230 |
| 2,057,314 | 10/1936 | Robinson | 317—230 |
| 2,079,516 | 5/1937 | Lilienfeld | 317—230 |
| 2,174,840 | 10/1939 | Robinson | 204—58 |
| 2,174,841 | 10/1939 | Robinson | 317—230 |
| 2,293,657 | 8/1942 | Mershon | 317—230 |
| 2,578,400 | 12/1951 | Cohn | 204—58 |
| 2,871,423 | 1/1959 | Aikman | 317—230 |

FOREIGN PATENTS 397,538   8/1933   Great Britain.

OTHER REFERENCES

Miyata (Alien Property Custodian publication of application 362,878, filed Oct. 25, 1940), published May 18, 1943.

JOHN W. HUCKERT, *Primary Examiner.*

SAMUEL BERNSTEIN, JAMES D. KALLAM, DAVID J. GALVIN, *Examiners.*